United States Patent
Hakka et al.

(10) Patent No.: US 6,342,169 B1
(45) Date of Patent: Jan. 29, 2002

(54) SAFE STORAGE AND TRANSPORTATION OF SULFUR DIOXIDE

(75) Inventors: Leo E. Hakka, Dollard-des-Ormeaux; Paul J. Parisi, Saint Lambert, both of (CA)

(73) Assignee: Cansolv Technologies, Inc., Quebec (CA)

( * ) Notice: Subject to any disclaimer, the term of this patent is extended or adjusted under 35 U.S.C. 154(b) by 0 days.

(21) Appl. No.: 09/380,078

(22) PCT Filed: Mar. 16, 1998

(86) PCT No.: PCT/CA98/00237

§ 371 Date: Aug. 25, 1999

§ 102(e) Date: Aug. 25, 1999

(87) PCT Pub. No.: WO98/42618

PCT Pub. Date: Oct. 1, 1998

(30) Foreign Application Priority Data

Mar. 25, 1997 (CA) .............................................. 2201004

(51) Int. Cl.[7] .............................. C09K 3/00; C01B 17/20
(52) U.S. Cl. .................... 252/189; 252/190; 423/242.7; 423/243
(58) Field of Search ................................ 252/189, 190; 423/242.7, 243.01

(56) References Cited

U.S. PATENT DOCUMENTS

| 3,645,671 | A | | 2/1972 | Griffin, Jr. et al. ........... 23/2 SQ |
| 3,733,780 | A | | 5/1973 | Bellisio et al. ................. 55/73 |
| 5,019,361 | A | * | 5/1991 | Hakka ......................... 423/243 |
| 5,202,103 | A | * | 4/1993 | Chang et al. ............. 423/242.7 |
| 5,262,139 | A | * | 11/1993 | Hakka et al. ............. 423/242.7 |
| 5,785,888 | A | | 7/1998 | Tsai et al. .................... 252/192 |

FOREIGN PATENT DOCUMENTS

EP 368422 5/1990

\* cited by examiner

*Primary Examiner*—Margaret Medley
*Assistant Examiner*—Cephia D. Toomer
(74) *Attorney, Agent, or Firm*—Shanks & Herbert

(57) ABSTRACT

The invention relates to a method of confining sulfur dioxide for storage or transportation under safe conditions. The method of the invention comprises the steps of (a) contacting a sulfur dioxide-containing gas stream with an absorbing medium comprising water and a water-soluble amine absorbent having at least one amine group with a pKa value greater than about 7 and at least one other amine group with a pKa value less than about 6.5 so that the at least one amine group with a pKa value greater than about 7 irreversibly absorbs sulfur dioxide in salt form rendering the amine absorbent non-volatile and the at least one other amine group with a pKa value less than about 6.5 reversibly absorbs sulfur dioxide, to thereby saturate the absorbing medium with sulfur dioxide against a partial pressure of sulfur dioxide of no more than about 1 atmosphere at 25° C.; and (b) charging the absorbing medium saturated with sulfur dioxide obtained in step (a) into a container for storage or transportation.

30 Claims, 4 Drawing Sheets

… … …

SAFE STORAGE AND TRANSPORTATION OF SULFUR DIOXIDE

This application is a 371 of PCT/CA98/00237, filed Mar. 16, 1998.

TECHNICAL FIELD

The present invention pertains to improvements in the field of storage and transportation of sulfur dioxide. More particularly, the invention relates to a method of confining sulfur dioxide for storage and/or transportation under safe conditions.

BACKGROUND ART

Sulfur dioxide ($SO_2$) is a widely used chemical in industries such as wood pulping and bleaching, corn wet milling, water treatment and the production of sulfuric acid. It is a colorless, nonflammable gas with a boiling point of −10° C. at atmospheric pressure. Sulfur dioxide is highly toxic by inhalation and a strong irritant to the eyes and mucous membranes. It is also a dangerous air contaminant and constituent of smog.

Currently, bulk quantities of sulfur dioxide are stored and transported as a liquid in suitable pressure vessels. The vapor pressure of liquid sulfur dioxide at temperatures that may occur in normal storage and transport operations can be up to 8 bar. Thus, in case of a leak in or rupture of the pressure vessel used to store or transport liquid sulfur dioxide, particularly if the damage occurs towards the bottom of the vessel, large quantities of sulfur dioxide can be released from the tank very rapidly. Since the sulfur dioxide at ambient temperature is above its boiling point, any liquid sulfur dioxide released to the atmosphere will vaporize rapidly, creating a vapor cloud of toxic gas that tends to stay at ground level, being heavier than air. Prevailing winds can then disperse the vapors, creating conditions hazardous to health or even lethal conditions over a large area. Concentration of 5 to 10 ppmv of sulfur dioxide in air will lead to irritation of the respiratory tract and concentrations above 400 to 500 parts per million by volume (ppmv), even for a few minutes, are dangerous to life. Areas adjacent to industrial $SO_2$ storage sites and railroads or roads used for the transportation of sulfur dioxide are thus at risk in the event of a release.

While it is known that sulfur dioxide dissolves in water to the extent of about 10% by weight, it is not a desirable solvent for the purpose of storing or transporting sulfur dioxide because of the expense of providing large tanks for the dilute solution. Moreover, it is not economical to transport sulfur dioxide in such a water solution because of the excessive cost of transporting nine tons of water for each ton of $SO_2$. Some organic compounds such as chloroform, formic acid, acetic acid, methanol, ethanol and acetone have high solvent power for sulfur dioxide, but these have the disadvantage that they are volatile and would contaminate the regenerated sulfur dioxide with undesirable impurities. In addition, most of these compounds are flammable, thus presenting a fire hazard where none existed before.

Aqueous solutions of alkalis such as sodium hydroxide can dissolve substantial quantities of sulfur dioxide by formation of sodium sulfite ($Na_2SO_3$), sodium bisulfite ($NaHSO_3$) and sodium pyrosulfite ($Na_2S_2O_5$). However, regenerability of sulfur dioxide from these solutions is incomplete, the maximum being about 13% by weight (theoretical) from a saturated aqueous solution of the pyrosulfite. This again implies a very high effective transportation cost for the sulfur dioxide.

DISCLOSURE OF INVENTION

It is therefore an object of the present invention to overcome the above drawbacks and to provide a method of confining sulfur dioxide for storage and/or transportation under safe conditions.

In accordance with the present invention, there is thus provided a method of confining sulfur dioxide for storage or transportation under safe conditions, which comprises the steps of:

(a) contacting a sulfur dioxide-containing gas stream with an absorbing medium comprising water and a water-soluble amine absorbent having at least one amine group with a pKa value greater than about 7 and at least one other amine group with a pKa value less than about 6.5 so that the at least one amine group with a pKa value greater than about 7 irreversibly absorbs sulfur dioxide in salt form rendering the amine absorbent non-volatile and the at least one other amine group with a pKa value less than about 6.5 reversibly absorbs sulfur dioxide, to thereby saturate the absorbing medium with sulfur dioxide against a partial pressure of sulfur dioxide of no more than about 1 atmosphere at 25° C.; and (b) charging the absorbing medium saturated with sulfur dioxide obtained in step (a) into storage or transportation means.

The expression "safe conditions" as used herein refers to conditions presenting a greatly reduced hazard to life and the environment in the case of a leak in or rupture of the storage or transportation container, in comparison to a similar leak or rupture when storing or transporting liquid sulfur dioxide. Since the absorbing medium saturated with sulfur dioxide is below its bubble point, the sulfur dioxide vapor cloud generated by a leak or spill of such a saturated absorbing medium is relatively small. With liquid sulfur dioxide, a very large vapor cloud is formed rapidly since essentially all the sulfur dioxide vaporizes. The use of an amine absorbent having at least one amine group with a pKa value greater than about 7 ensures that the amine absorbent is nonvolatile since such an amine group irreversibly absorbs sulfur dioxide to form a salt which is not regenerable under the normal operating conditions of the process.

Preferably, the amine absorbent has at least one amine group with a pKa value of about 7.5 to about 10 and at least one other amine group with a pKa value of about 4.5 to about 6.0.

Examples of suitable amine absorbents which may be used in accordance with the present invention are diamines having the general formula:

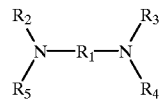

wherein $R_1$ is an alkylene group having 1 to 3 carbon atoms, $R_2$, $R_3$, $R_4$ and $R_5$ are the same or different and each represent a hydrogen atom, a lower alkyl group having 1 to 8 carbon atoms or a lower hydroxy-alkyl group having 2 to 8 carbon atoms, or any of $R_2$, $R_3$, $R_4$ and $R_5$ form together with the nitrogen atoms to which they are attached a 6-membered ring.

Examples of preferred diamines in free base form include: N,N',N'-(trimethyl)-N-(2-hydroxyethyl)-ethylenediamine, N,N,N',N'-tetramethyl-ethylenediamine, N,N,N',N'-tetramethyl-diaminomethane, N,N,N',N'-tetrakis-(2-hydroxyethyl)-ethylenediamine,
N,N'-dimethylpiperazine,
N,N,N',N'-tetrakis-(2-hydroxyethyl)-1,3-diaminopropane,
N',N'-dimethyl-N,N-bis-(2-hydroxyethyl)-ethylenediamine,
N-methyl N'-(2-hydroxyethyl)-piperazine,
N-(2-hydroxyethyl)-piperazine,
N,N'-bis(2-hydroxyethyl)-piperazine,
N-methyl-piperazine, and piperazine.

According to a preferred embodiment, step (a) is carried out in a gas/liquid contact apparatus providing countercurrent gas and liquid flows.

Where the sulfur dioxide-containing gas stream is a gaseous stream of substantially pure water-saturated sulfur dioxide, step (a) is preferably carried out under substantially atmospheric pressure and ambient temperature conditions. On the other hand, when the sulfur dioxide-containing gas stream contains less than about 90% by volume of sulfur dioxide, step (a) is preferably carried out by:

i) contacting the sulfur dioxide-containing gas stream with the absorbing medium to produce a sulfur dioxide-laden absorbing medium;

ii) dividing the sulfur dioxide-laden absorbing medium into separate first and second portions each representing a predetermined proportion of the sulfur dioxide-laden absorbing medium;

iii) removing the absorbed sulfur dioxide from the second portion of sulfur dioxide-laden absorbing medium to regenerate the amine absorbent contained therein and thereby produce a sulfur dioxide-depleted absorbing medium and a gaseous stream of substantially pure water-saturated sulfur dioxide; and iv) contacting the gaseous stream of substantially pure water-saturated sulfur dioxide with the first portion of sulfur dioxide-laden absorbing medium, whereby the proportion of sulfur dioxide-laden absorbing medium represented by the second portion is such to produce in step (iii) sufficient gaseous sulfur dioxide to saturate in step (iv) the first portion of sulfur dioxide-laden absorbing medium with sulfur dioxide against a partial pressure of sulfur dioxide of no more than about 1 atmosphere at 25° C.

The sulfur dioxide-depleted absorbing medium produced in step (a) (iii) is advantageously recycled in step (a) (i) for absorption of sulfur dioxide. Any sulfur dioxide emissions produced in step (a) (iv) are preferably recycled to step (a) (i) for admixture with the sulfur dioxide-containing gas stream.

When it is desired to use the sulfur dioxide at a consuming site, the absorbing medium saturated with sulfur dioxide is charged into a transport container or pipeline and conveyed to the consuming site where the absorbed sulfur dioxide is removed from the saturated absorbing medium to regenerate the amine absorbent contained therein and thereby produce another sulfur dioxide-depleted absorbing medium and a gaseous stream of substantially pure water-saturated sulfur dioxide for consumption. Preferably, the other sulfur dioxide-depleted absorbing medium is combined with the sulfur dioxide-depleted absorbing medium produced in step (a) (iii) and the combined sulfur dioxide-depleted absorbing media are recycled to step (a) (i) for absorption of sulfur dioxide.

According to another preferred embodiment where the sulfur dioxide-containing gas stream contains less than about 90% by volume of sulfur dioxide, step (a) is carried out by:

i) contacting the sulfur dioxide-containing gas stream with a first absorbing medium comprising water and the amine absorbent to produce a sulfur dioxide-laden absorbing medium;

ii) removing the absorbed sulfur dioxide from the sulfur dioxide-laden absorbing medium to regenerate the amine absorbent contained therein and thereby produce a sulfur dioxide-depleted absorbing medium and a gaseous stream of substantially pure water-saturated sulfur dioxide; and iii) contacting the gaseous stream of substantially pure water-saturated sulfur dioxide with a second absorbing medium comprising water and the amine absorbent, the first and second absorbing media differing from one another in water content or type of amine absorbent so that the second absorbing medium has an absorption capacity for sulfur dioxide greater than the first absorbing medium, to saturate the second absorbing medium with sulfur dioxide against a partial pressure of sulfur dioxide of no more than about 1 atmosphere at 25° C.

The sulfur dioxide-depleted absorbing medium produced in step (a) (ii) is advantageously recycled in step (a) (i) for absorption of sulfur dioxide. Any sulfur dioxide emissions produced in step (a) (iii) are preferably recycled to step (a) (i) for admixture with the sulfur dioxide containing gas stream.

According to a further preferred embodiment where the sulfur dioxide-containing gas stream contains less than about 90% by volume of sulfur dioxide, step (a) is carried out by:

i) contacting the sulfur dioxide-containing gas stream with a first absorbing medium comprising water and the amine absorbent to produce a first sulfur dioxide-laden absorbing medium and a partially scrubbed sulfur dioxide-containing gas stream;

ii) contacting the partially scrubbed sulfur dioxide-containing gas stream with a second absorbing medium comprising water and the amine absorbent, the first and second absorbing media differing from one another in water content or type of amine so that the second absorbing medium has an absorption capacity for sulfur dioxide less than the first absorbing medium, to produce a second sulfur dioxide-laden absorbing medium;

iii) removing the absorbed sulfur dioxide from the second sulfur dioxide-laden absorbing medium to regenerate the amine absorbent contained therein and thereby produce a sulfur dioxide-depleted absorbing medium and a gaseous stream of substantially pure water-saturated sulfur dioxide; and iv) contacting the gaseous stream of substantially pure water-saturated sulfur dioxide with the first sulfur dioxide-laden absorbing medium to saturate the first absorbing medium with sulfur dioxide against a partial pressure of sulfur dioxide of no more than about 1 atmosphere at 25° C.

The sulfur dioxide-depleted absorbing medium produced in step (a) (iii) is advantageously recycled to step (a) (ii) for absorption of sulfur dioxide. Any sulfur dioxide emissions produced in step (a) (iv) are preferably recycled to step (a) (i) for admixture with said sulfur dioxide-containing gas stream.

Preferably, steps (a) (i) and (a) (ii) are carried out in a gas/liquid contact apparatus comprising first and second gas/liquid contact zones in gas flow communication with one another. The sulfur dioxide-containing gas stream is contacted in the first zone with the first absorbing medium, the partially scrubbed sulfur dioxide-containing gas flowing from the first zone to the second zone for contact with the second absorbing medium in the second zone. The sulfur dioxide-depleted absorbing medium produced in step (a) (iii) is advantageously recycled to step (a) (ii) for absorption of sulfur dioxide in the second zone. Any sulfur dioxide emissions produced in step (a) (iv) are preferably recycled to step (a) (i) for admixture with the sulfur dioxide-containing gas stream.

BRIEF DESCRIPTION OF DRAWINGS

Further features and advantages of the invention will become more readily apparent from the following description of preferred embodiments thereof, with reference to the accompanying drawings, in which.

MODES OF CARRYING OUT THE INVENTION

Figure 1:
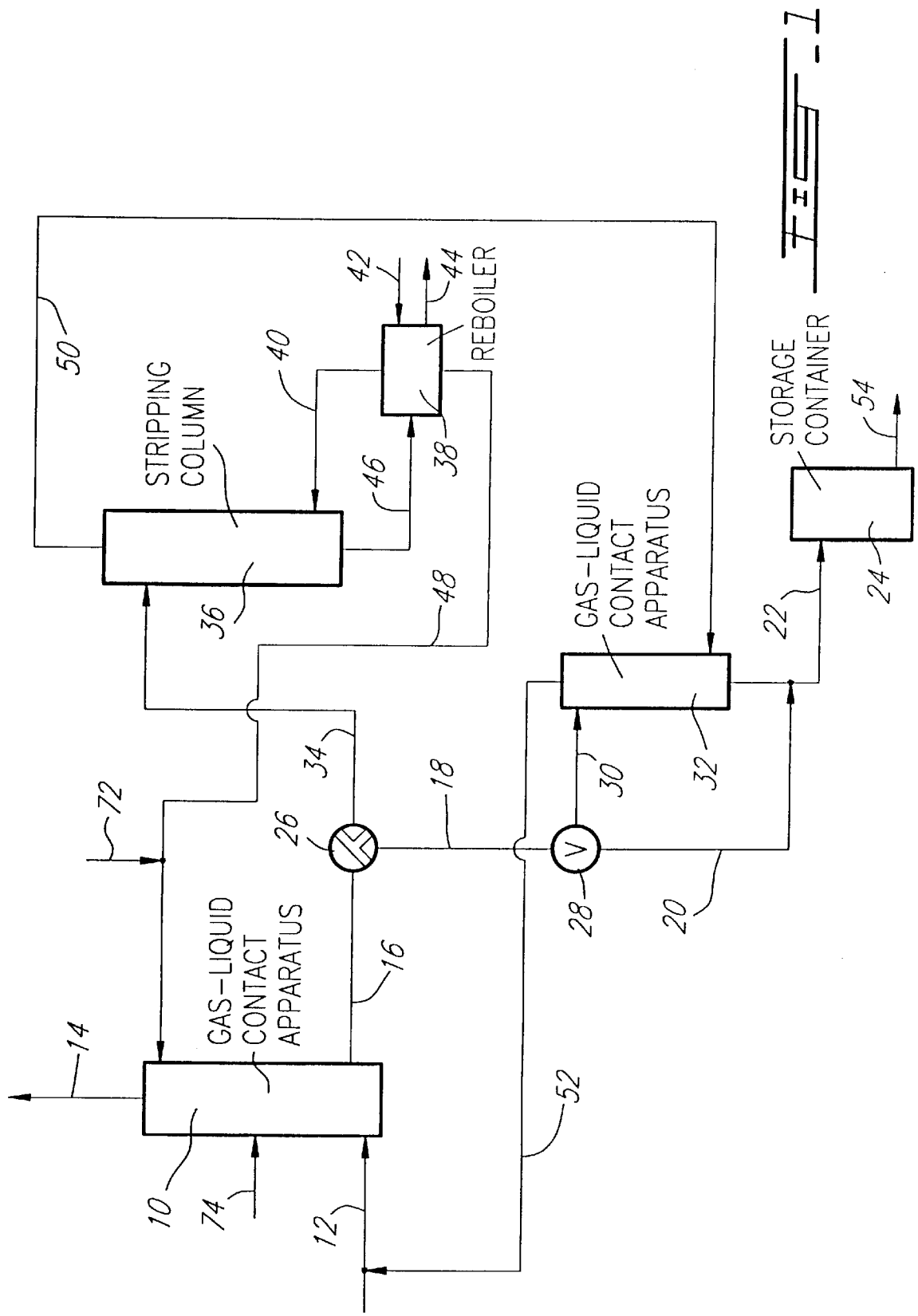
FIG. 1 is a flow diagram of a method according to a first preferred embodiment of the invention.

Referring first to FIG. 1, there is schematically illustrated a gas-liquid contact apparatus 10 providing countercurrent gas and liquid flows. A sulfur dioxide-containing gas stream is fed via line 12 to the apparatus 10 wherein it is contacted with an aqueous absorbing medium comprising water and a water-soluble diamine absorbent having a first amine group with a pKa value greater than 7 and a second amine group with a pKa value less than 6.5. The first amine group irreversibly absorbs sulfur dioxide in salt form rendering the diamine absorbent non-volatile and the second amine group reversibly absorbs sulfur dioxide. Where the sulfur dioxide-containing gas stream in line 12 is a gaseous stream of substantially pure sulfur dioxide, the absorption in the apparatus 10 is carried out under substantially atmospheric pressure and ambient temperature conditions to saturate the absorbing medium with sulfur dioxide against a partial pressure of sulfur dioxide of no more than about 1 atmosphere at 25° C. Feed gas residue is discharged from the apparatus 10 and passed via line 14 to a stack (not shown). The $SO_2$-saturated absorbing medium is withdrawn from the apparatus 10 and passed via lines 16, 18, 20 and 22 to a buffer storage container 24, valves 26 and 28 being positioned to provide liquid flow communication between lines 16, 18 and 20.

When the sulfur dioxide-containing gas stream in line 12 contains less than about 90% by volume of sulfur dioxide, the absorption carried out in the apparatus 10 produces a sulfur-laden absorbing medium which is removed from the apparatus by line 16 and divided by means of the three-way valve 26 into separate first and second portions each representing a predetermined proportions of the sulfur dioxide-laden absorbing medium. The first portion is passed via lines 18 and 30 to a gas-liquid contact apparatus 32, the two-way valve 28 being positioned to provide liquid flow communication between lines 18 and 30. The second portion of sulfur dioxide-laden absorbing medium is sent via line 34 to a stripping column 36 for removing the absorbed sulfur dioxide from the second portion and regenerating the diamine absorbent contained therein, by means of steam fed from a reboiler 38 via line 40. Steam is introduced into the reboiler 38 by line 42 and condensate is removed therefrom by line 44. The sulfur dioxide-depleted absorbing medium is recovered from the stripping column 36 by line 46, passed through the reboiler 38 and recycled via line 48 of the gas-liquid contact apparatus 10 for absorption of sulfur dioxide. A gaseous stream of substantially pure water-saturated sulfur dioxide is withdrawn from the stripping column 36 into an overhead reflux condenser (not shown) and passed via line 50 to the gas-liquid contact apparatus 32 wherein it is contacted with the first portion of sulfur dioxide-laden absorbing medium fed via line 30.

The proportion of sulfur dioxide-laden absorbing medium represented by the second portion is such to produce in the stripping column 36 sufficient gaseous sulfur dioxide to saturate in the apparatus 32 the first portion of sulfur dioxide-laden absorbing with sulfur dioxide against a partial pressure of sulfur dioxide of no more than about 1 atmosphere at 25° C. The $SO_2$-saturated absorbing medium is withdrawn from the apparatus 32 and passed via line 22 to the buffer storage container 24. Any sulfur dioxide emissions produced in the apparatus 32 are removed therefrom and recycled via lines 52 and 12 to the apparatus 10, in admixture with the sulfur dioxide-containing gas stream in line 12.

The $SO_2$-saturated absorbing medium in the storage container 24 can be transferred via line 54 to a transport container (not shown) for transportation to a consuming site where the absorbed sulfur dioxide is removed from the $SO_2$-saturated absorbing medium to regenerate the diamine absorbent contained therein and thereby produce another sulfur dioxide-depleted absorbing medium and a gaseous stream of substantially pure water-saturated sulfur dioxide for consumption. For example, use can be made at the consuming site of the stripping column 56 illustrated in FIG. 4.

The embodiment illustrated in FIG. 1 has the advantage of ensuring that maximum quantities of sulfur dioxide are contained in the absorbing medium to be stored or shipped, regardless of the $SO_2$ content in the feed gas stream, temperature of the absorption or the gas/liquid ratio in the apparatus 10.

Figure 4:
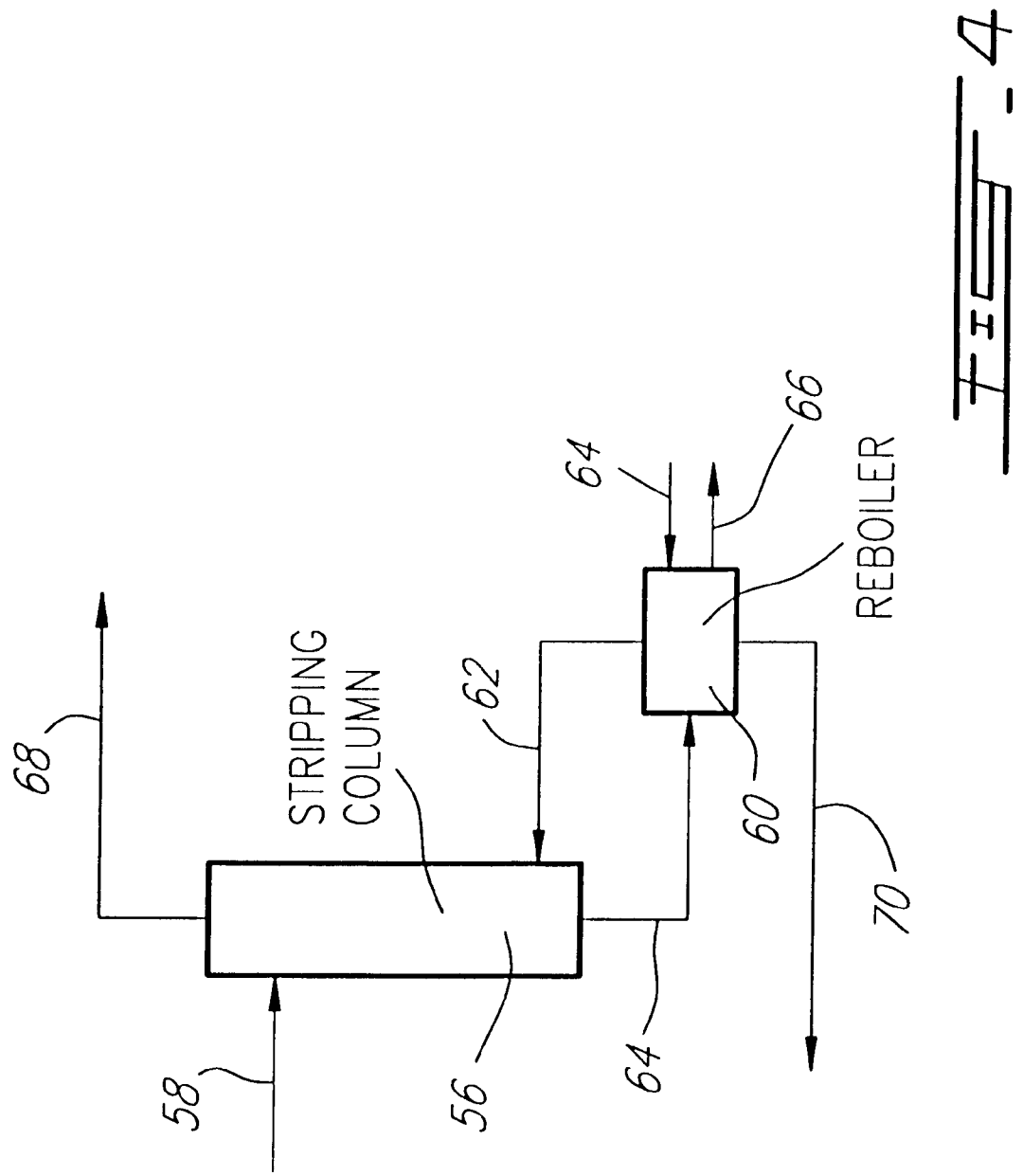
FIG. 4 schematically illustrates how the sulfur dioxide is removed from the $SO_2$-saturated absorbing medium obtained by the methods in accordance with the flow diagrams of FIGS. 1, 2 and 3.

As shown in FIG. 4, the $SO_2$-saturated absorbing medium is fed via line 58 to the stripping column 56 wherein the absorbed sulfur dioxide is removed from the $SO_2$-saturated absorbing medium by means of steam fed from a reboiler 60 via line 62. Steam is introduced into the reboiler 60 by line 64 and condensate is removed therefrom by line 66. The gaseous stream of substantially pure water-saturated sulfur dioxide for consumption is discharged via line 68 from the stripping column 56. The sulfur dioxide-depleted absorbing medium is recovered from the stripping column 56, passed through the reboiler 60 and charged via line 70 into a transport container (not shown) for recycling to the apparatus 10 shown in FIG. 1. Such a sulfur dioxide-depleted absorbing medium can be either admixed via line 72 with the sulfur dioxide-depleted absorbing medium in line 48 or fed via line 74 directly to the apparatus 10. In the latter case, the sulfur dioxide-depleted absorbing medium recovered from the stripping column 56 and fed via line 74 mixes with the sulfur dioxide-depleted absorbing medium recovered from the stripping column 36 and fed via line 48, in a mixing zone adjacent the inlet through which the sulfur dioxide-depleted absorbing medium recovered from the stripping column 56 is fed. This ensures that the degree of $SO_2$ removal from the feed gas stream is controlled to the desired level by controlling the degree of diamine regeneration in the stripping column 36, regardless of the degree of diamine regeneration in the stripping column 56.

A further embodiment resides in the use of two different absorbing media, one being optimized for efficiency and stability for removal of sulfur dioxide from the feed gas stream, and the other being more desirable as the storage and/or transport medium. The two absorbing media may differ in water content and/or type of amine absorbent, while still being of the class of amines described herein. Such an embodiment may be practiced according to two variants illustrated in FIGS. 2 and 3.

Figure 2:
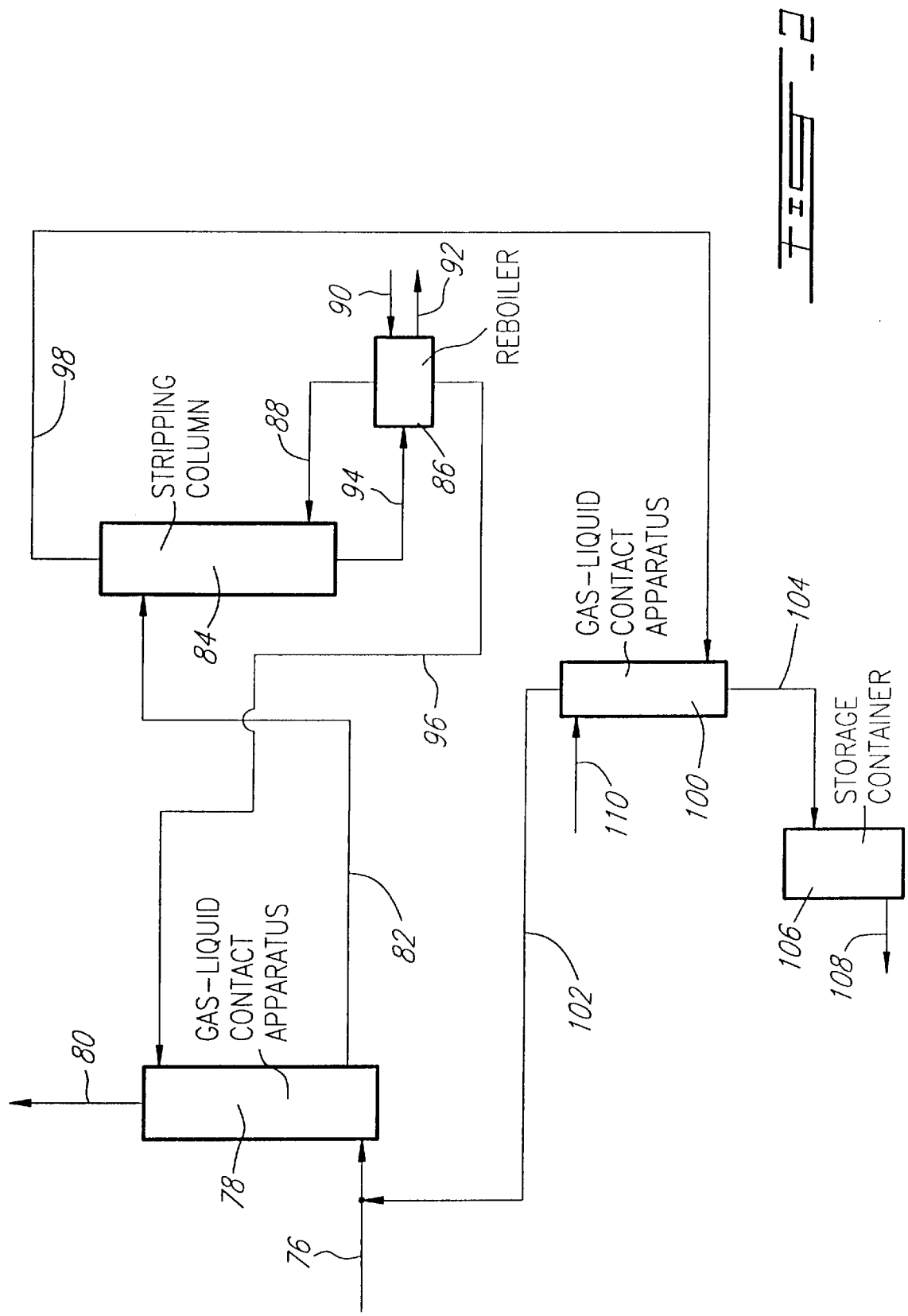
FIG. 2 is another flow diagram of a method according to a second preferred embodiment of the invention.

As shown in FIG. 2, a sulfur dioxide-containing gas stream containing less than about 90% by volume of sulfur dioxide is fed via line 76 to a gas-liquid contact apparatus 78 wherein it is contacted with a first absorbing medium comprising water and a diamine absorbent of the class described herein, to produce a sulfur dioxide-laden absorbing medium. Feed gas residue is discharged from the apparatus 78 and passed via line 80 to a stack (not shown). The sulfur dioxide-laden absorbing medium is withdrawn from the apparatus 78 and passed via line 82 to a stripping column 84 for removing the absorbed sulfur dioxide from the first absorbing medium and regenerating the diamine absorbent contained in the first absorbing medium, by means of steam fed from a reboiler 86 via line 88. Steam is introduced into the reboiler 86 by line 90 and condensate is removed therefrom by line 92. The sulfur dioxide-depleted absorbing medium is recovered from the stripping column 84 by line 94, passed through the reboiler and recycled via line 96 to the apparatus 78 for absorption of sulfur dioxide. A gaseous stream of substantially pure water saturated sulfur dioxide is withdrawn from the stripping column 84 into an overhead reflux condenser (not shown) and passed via line 98 to a gas-liquid contact apparatus 100 wherein it is contacted with a second absorbing medium comprising water and a diamine absorbent of the class described herein, to saturate the second absorbing medium with sulfur dioxide against a partial pressure of sulfur dioxide of no more than about 1 atmosphere at 25° C. The first and second absorbing media differ from one another in water or type of amine absorbent so that the second absorbing has an absorption capacity for sulfur dioxide greater than the first absorbing medium. Any sulfur dioxide emissions produced in the apparatus 100 are removed therefrom and recycled via lines 102 and 76 to the apparatus 78, in admixture with the sulfur dioxide-containing gas stream in line 76.

The second absorbing medium saturated with sulfur dioxide is withdrawn from the apparatus 100 and passed via line 104 to a buffer storage container 106 from which it can be transferred via line 108 to a transport container (not shown) for transportation to a consuming site. Use can be made at the consuming site of the stripping column 56 shown in FIG. 4 for removing the absorbed sulfur dioxide from the SO$_2$-saturated absorbing medium to regenerate the diamine absorbent contained in the second absorbing medium and thereby produce another sulfur dioxide-depleted absorbing medium and a gaseous stream of substantially pure water-saturated sulfur dioxide for consumption. The sulfur dioxide-depleted absorbing medium which is recovered from the stripping column 56 is recycled to the apparatus 100 and fed therein via line 110, for absorption of sulfur dioxide.

Figure 3:
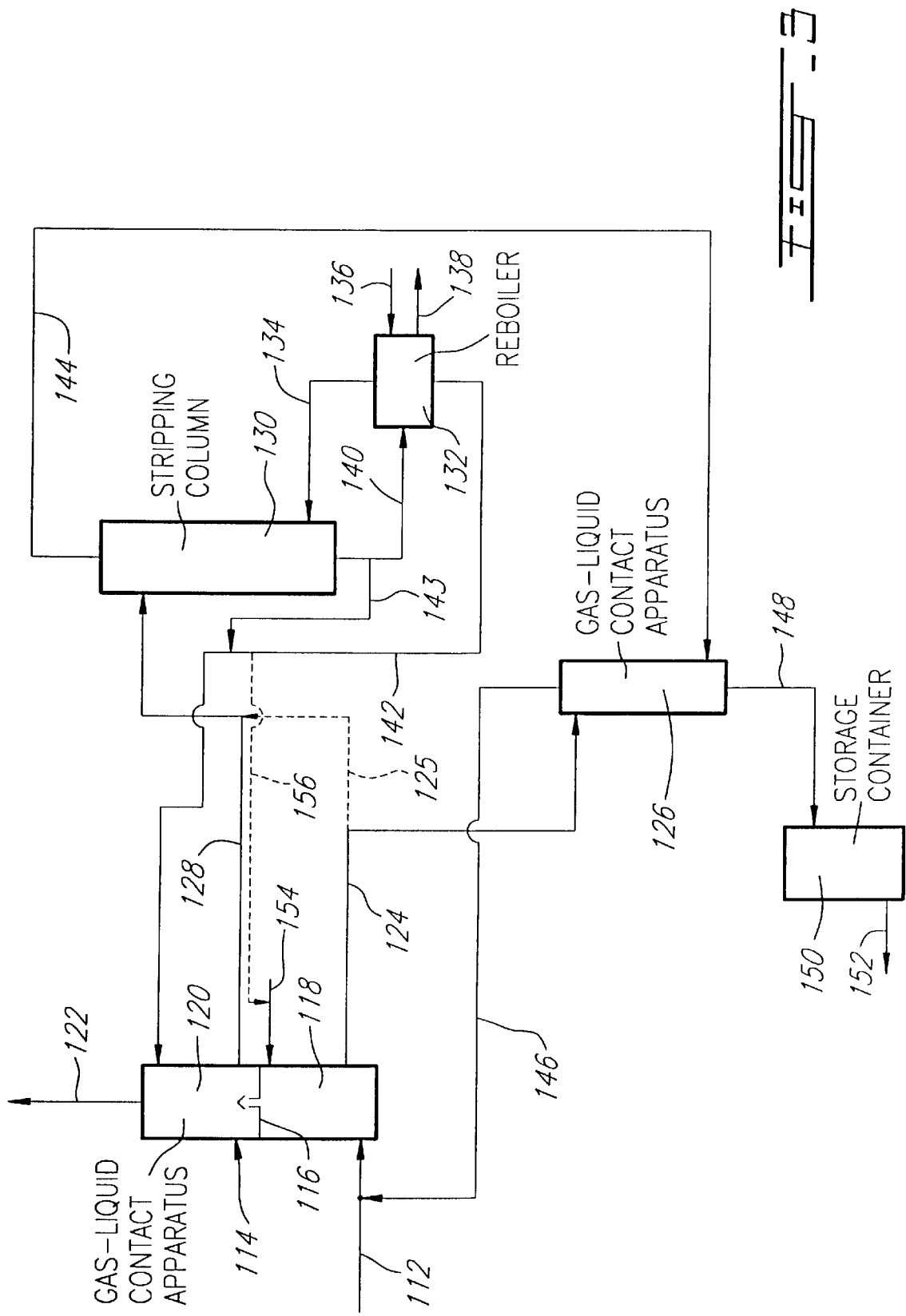
FIG. 3 is a further flow diagram of a method according to a third preferred embodiment of the invention.

In the embodiment illustrated in FIG. 3, a sulfur dioxide-containing gas stream containing less than about 90% by volume of sulfur dioxide is fed via line 112 to a gas-liquid contact apparatus 114 provided with a chimney tray 116 defining a lower gas-liquid contact zone 118 and an upper gas-liquid contact zone 120 in gas flow communication with one another. The sulfur dioxide-containing gas stream in line 112 is contacted in the lower zone 118 with a first absorbing medium comprising water and a diamine absorbent of the class described herein, to produce a first sulfur dioxide-laden absorbing medium and a partially scrubbed sulfur dioxide-containing gas stream which flows upwardly through chimney tray 116 and into the upper gas-liquid contact zone where it is contacted with a second absorbing medium comprising water and a diamine absorbent of the class described herein to produce a second sulfur dioxide-laden absorbing medium. The first and second absorbing media differ from one another in water content or type of amine absorbent so that the second absorbing medium has an absorption capacity for sulfur dioxide less than the first absorbing medium. Feed gas residue is discharged from the apparatus 114 and passed via line 122 to a stack (not shown). The first sulfur dioxide-laden absorbing medium is withdrawn from the apparatus 114 and passed via line 124 to a gas-liquid contact apparatus 126. The second sulfur dioxide-laden absorbing medium is also withdrawn from the apparatus 114 and passed via line 128 to a stripping column 130 for removing the absorbed sulfur dioxide from the second absorbing medium and regenerating the diamine absorbent contained therein, by means of steam fed from a reboiler 132 via line 134. A fraction of the first sulfur dioxide-laden absorbing medium may optionally be introduced via line 125 into the second sulfur dioxide-laden absorbing medium, for regenerating the diamine absorbent contained therein. Steam is introduced into the reboiler 132 by line 136 and condensate is removed therefrom by line 138. The sulfur dioxide-depleted absorbing medium is recovered from the stripping column 130 by line 140, passed through the reboiler 132 and recycled via line 142 to the second zone 120 of the apparatus 114 for absorption of sulfur dioxide. A fraction of the sulfur dioxide-depleted absorbing medium recovered from the stripping column 120 by line 140 and having a higher water content than the absorbing medium recycled via line 142 is admixed with the latter via line 143. A gaseous stream of substantially pure water-saturated sulfur dioxide is withdrawn from the stripping column 130 into an overhead reflux condenser (not shown) and passed via line 144 to the gas-liquid contact apparatus 126 wherein it is contacted with the first sulfur dioxide-laded absorbing medium fed via line 124, to saturate the first absorbing medium with sulfur dioxide against a partial pressure of sulfur dioxide of no more than about 1 atmosphere at 25° C. Any sulfur dioxide emissions produced in the apparatus 126 are removed therefrom and recycled via lines 146 and 112 to the lower zone 118 of the apparatus 114, in admixture with the sulfur dioxide-containing gas stream in line 112.

The first absorbing medium saturated with sulfur dioxide is withdrawn from the apparatus 126 and passed via line 148 to a buffer storage container 150 from which it can be transferred via line 152 to a transport container (not shown) for transportation to a consuming site. Use can be made at the consuming site of the stripping column 56 shown in FIG. 4 for removing the absorbed sulfur dioxide from the SO$_2$-saturated absorbing medium to regenerate the diamine absorbent contained in the first absorbing medium and thereby produce another sulfur dioxide-depleted absorbing medium and a gaseous stream of substantially pure water-saturated sulfur dioxide for consumption. The sulfur dioxide-depleted absorbing medium which is recovered from the stripping column 56 is recycled to the zone 118 of the apparatus 116 and fed therein via line 154, for absorption of sulfur dioxide. A fraction of the sulfur dioxide-depleted absorbing medium recycled via line 142 to zone 120 of the apparatus 114 may optionally be introduced via line 156 into the sulfur dioxide-depleted absorbing medium fed via line 154 to zone 118 of the apparatus. The amount of diamine introduced via line 156 serves to replace at least partially the amount of diamine contained in the fraction of sulfur dioxide-laden absorbing medium passing in line 125.

In the stripping columns 36, 56, 84 and 130, the operating pressure is generally in the range of 10–20 psi absolute.

While the above description of the preferred embodiments does not describe in detail all the equipment, such as heat exchangers, pumps, instrumentation necessary or desirable to the process, such equipment would be known to those skilled in the art.

The following diamines were evaluated for their effectiveness in absorbing sulfur dioxide. The results are shown in Table 1:

TABLE I

| Absorbent | $SO_2$ Solubility, grains/100 grams of absorbent | $SO_2$ Recovery, grams/100 grams of saturated absorbent |
| --- | --- | --- |
| 25% aqueous HEP* | 32.4 | 13.9 |
| 45% aqueous HEP* | 53.2 | 21.2 |
| 25% aqueous DIHEP** | 25.2 | 13.6 |

*HEP: N-(2-hydroxyethyl)piperazine (MW 130);
**DIHEP: N,N'-bis(2-hydroxyethyl)piperazine (MW 174).

What is claimed is:

1. A method of confining sulfur dioxide for storage or transportation under safe conditions, which comprises the steps of:
   a) contacting a sulfur dioxide-containing gas stream with an absorbing medium comprising water and a water-soluble amine absorbent having at least one amine group with a pKa value greater than about 7 and at least one other amine group with a pKa value less than about 6.5 so that said at least one amine group with a pKa value greater than about 7 irreversibly absorbs sulfur dioxide in salt form rendering said amine absorbent non-volatile and said at least one other amine group with a pKa value less than about 6.5 reversibly absorbs sulfur dioxide, to thereby saturate said absorbing medium with sulfur dioxide against a partial pressure of sulfur dioxide of no more than about 1 atmosphere at 25° C.; and
   b) charging the absorbing medium saturated with sulfur dioxide obtained in step (a) into storage or transportation means.

2. A method as claimed in claim 1, wherein said amine absorbent has at least one amine group with a pKa value of about 7.5 to about 10 and at least one other amine group with a pKa value of about 4.5 to about 6.0.

3. A method as claimed in claim 2, wherein said amine absorbent is a diamine.

4. A method as claimed in claim 3, wherein said diamine has the general formula:

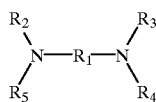

wherein $R_1$ is an alkylene group having 1 to 3 carbon atoms, $R_2$, $R_3$, $R_4$ and $R_5$ are the same or different and each represent a hydrogen atom, a lower alkyl group having 1 to 8 carbon atoms or a lower hydroxy-alkyl group having 2 to 8 carbon atoms, or any of $R_2$, $R_3$, $R_4$ and $R_5$ form together with the nitrogen atoms to which they are attached a 6-membered ring.

5. A method as claimed in claim 4, wherein said diamine is selected from the group consisting of N,N',N'-(trimethyl)-N-(2-hydroxyethyl)-ethylenediamine, N,N,N',N'-tetramethyl-ethylenediamine, N,N,N',N'-tetramethyldiaminomethane, N,N,N',N'-tetrakis-(2-hydroxyethyl)-ethylenediamine, N,N'-dimethylpiperazine, N,N,N',N'-tetrakis-(2-hydroxyethyl)-1,3-diaminopropane, N',N'-dimethyl-N,N-bis-(2-hydroxyethyl)-ethylenediamine, N-methyl N'-(2-hydroxyethyl)-piperazine, N-(2-hydroxyethyl)-piperazine, N,N'-bis(2-hydroxyethyl)-piperazine, N-methyl-piperazine, and piperazine.

6. A method as claimed in claim 5, wherein said diamine is N-(2-hydroxyethyl)-piperazine or N,N'-bis(2-hydroxyethyl)-piperazine.

7. A method as claimed in claim 1, wherein step (a) is carried out in a gas-liquid contact apparatus providing countercurrent gas and liquid flows.

8. A method as claimed in claim 1, wherein said sulfur dioxide-containing gas stream is a gaseous stream of substantially pure sulfur dioxide.

9. A method as claimed in claim 8, wherein step (a) is carried out under substantially atmospheric pressure and ambient temperature conditions.

10. A method as claimed in claim 1, wherein said sulfur dioxide-containing gas stream contains less than about 90% by volume of sulfur dioxide, and wherein step (a) is carried out by:
   i) contacting said sulfur dioxide-containing gas stream with said absorbing medium to produce a sulfur dioxide-laden absorbing medium;
   ii) dividing the sulfur dioxide-laden absorbing medium into separate first and second portions;
   iii) removing the absorbed sulfur dioxide from the second portion of sulfur dioxide-laden absorbing medium to regenerate the amine absorbent contained therein and thereby produce a sulfur dioxide-depleted absorbing medium and a gaseous stream of substantially pure water-saturated sulfur dioxide; and
   iv) contacting the gaseous stream of substantially pure water-saturated sulfur dioxide with the first portion of sulfur dioxide-laden absorbing medium, whereby the proportion of sulfur dioxide-laden absorbing medium represented by said second portion is such to produce in step (iii) sufficient gaseous sulfur dioxide to saturate in step (iv) said first portion of sulfur dioxide-laden absorbing medium with sulfur dioxide against a partial pressure of sulfur dioxide of no more than about 1 atmosphere at 25° C.

11. A method as claimed in claim 10, wherein the sulfur dioxide-depleted absorbing medium produced in step (a) (iii) is recycled to step (a) (i) for absorption of sulfur dioxide.

12. A method as claimed in claim 10, wherein any sulfur dioxide emissions produced in step (a) (iv) are recycled to step (a) (i) for admixture with said sulfur dioxide-containing gas stream.

13. A method as claimed in claim 10, wherein the absorbing medium saturated with sulfur dioxide is charged into a transport container and transported to a consuming site where the absorbed sulfur dioxide is removed from the saturated absorbing medium to regenerate the amine absorbent contained therein and thereby produce another sulfur dioxide-depleted absorbing medium and a gaseous stream of substantially pure water-saturated sulfur dioxide for consumption.

14. A method as claimed in claim 13, wherein said other sulfur dioxide-depleted absorbing medium is combined with the sulfur dioxide-depleted absorbing medium produced in step (a) (iii) and wherein the combined sulfur dioxide-depleted absorbing media are recycled to step (a) (i) for absorption of sulfur dioxide.

15. A method as claimed in claim 13, wherein step (a) (i) is carried out in a gas-liquid contact apparatus providing countercurrent gas and liquid flows and having a first inlet means for feeding said sulfur dioxide-containing gas stream into said apparatus, a first outlet means for discharging feed gas residue from said apparatus, a second inlet means adjacent said first outlet means for feeding the sulfur dioxide-depleted absorbing medium produced in step (a) (iii), a third inlet means between said first and second inlet means for feeding said other sulfur dioxide-depleted absorbing medium so as to mix with the sulfur dioxide-depleted absorbing medium fed through said second inlet means, in a mixing zone adjacent said third inlet means, and a second outlet means for discharging said sulfur dioxide-laden absorbing medium.

16. A method as claimed in claim 1, wherein said sulfur dioxide-containing gas stream contains less than about 90% by volume of sulfur dioxide, and wherein step (a) is carried out by:
   i) contacting said sulfur dioxide-containing gas stream with a first absorbing medium comprising water and said amine absorbent to produce a sulfur dioxide-laden absorbing medium;
   ii) removing the absorbed sulfur dioxide from said sulfur dioxide-laden absorbing medium to regenerate the amine absorbent contained therein and thereby produce a sulfur dioxide depleted absorbing medium and a gaseous stream of substantially pure water-saturated sulfur dioxide; and
   iii) contacting the gaseous stream of substantially pure water-saturated sulfur dioxide with a second absorbing medium comprising water and said amine absorbent, said first and second absorbing media differing from one another in water content or type of amine absorbent so that said second absorbing medium has an absorption capacity for sulfur dioxide greater than said first absorbing medium, to saturate said second absorbing medium with sulfur dioxide against a partial pressure of sulfur dioxide of no more than about 1 atmosphere at 25° C.

17. A method as claimed in claim 16, wherein the sulfur dioxide-depleted absorbing medium produced in step (a) (ii) is recycled to step (a) (i) for absorption of sulfur dioxide.

18. A method as claimed in claim 16, wherein any sulfur dioxide emissions produced in step (a) (iii) are recycled to step (a) (i) for admixture with said sulfur dioxide containing gas stream.

19. A method as claimed in claim 16, wherein said second absorbing medium saturated with sulfur dioxide is charged into said transportation means and conveyed to a consuming site where the absorbed sulfur dioxide is removed from the saturated absorbing medium to regenerate the amine absorbent contained therein and thereby produce another sulfur dioxide-depleted absorbing medium and a gaseous stream of substantially pure water-saturated sulfur dioxide for consumption.

20. A method as claimed in claim 19, wherein said other sulfur dioxide-depleted absorbing medium is recycled to step (a) (iii) for absorption of sulfur dioxide.

21. A method as claimed in claim 1, wherein said sulfur dioxide-containing gas stream contains less than about 90% by volume of sulfur dioxide, and wherein step (a) is carried out by:
   i) contacting said sulfur dioxide-containing gas stream with a first absorbing medium comprising water and said amine absorbent to produce a first sulfur dioxide-laden absorbing medium and a partially scrubbed sulfur dioxide-containing gas stream;
   ii) contacting said partially scrubbed sulfur dioxide-containing gas stream with a second absorbing medium comprising water and said amine absorbent, said first and second absorbing media differing from one another in water content or type of amine absorbent so that said second absorbing medium has an absorption capacity for sulfur dioxide less than said first absorbing medium, to produce a second sulfur dioxide-laden absorbing medium;
   iii) removing the absorbed sulfur dioxide from said second sulfur dioxide-laden absorbing medium to regenerate the amine absorbent contained therein and thereby produce a sulfur dioxide-depleted absorbing medium and a gaseous stream of substantially pure water-saturated sulfur dioxide; and
   iv) contacting the gaseous stream of substantially pure water-saturated sulfur dioxide with said first sulfur dioxide-laden absorbing medium to saturate said first absorbing medium with sulfur dioxide against a partial pressure of sulfur dioxide of no more than about 1 atmosphere at 25° C.

22. A method as claimed in claim 21, wherein the sulfur dioxide-depleted absorbing medium produced in step (a) (iii) is recycled to step (a) (ii) for absorption of sulfur dioxide.

23. A method as claimed in claim 21, wherein any sulfur dioxide emissions produced in step (a) (iv) are recycled to step (a) (i) for admixture with said sulfur dioxide-containing gas stream.

24. A method as claimed in claim 21, wherein said first absorbing medium saturated with sulfur dioxide is charged into said transportation means and conveyed to a consuming site where the absorbed sulfur dioxide is removed from the saturated absorbing medium to regenerate the amine absorbent contained therein and thereby produce another sulfur dioxide-depleted absorbing medium and a gaseous stream of substantially pure water-saturated sulfur dioxide for consumption.

25. A method as claimed in claim 24, wherein said other sulfur dioxide-depleted absorbing medium is recycled to step (a) (i) for absorption of sulfur dioxide.

26. A method as claimed in claim 21, wherein steps (a) (i) and (a) (ii) are carried out in a gas-liquid contact apparatus comprising first and second gas-liquid contact zones in gas flow communication with one another, and wherein said sulfur dioxide-containing gas stream is contacted in said first zone with said first absorbing medium, said partially scrubbed sulfur dioxide-containing gas flowing from said first zone to said second zone for contact with said second absorbing medium in said second zone.

27. A method as claimed in claim 26, wherein the sulfur dioxide-depleted absorbing medium produced in step (a) (iii) is recycled to step (a) (ii) for absorption of sulfur dioxide in said second zone.

28. A method as claimed in claim 26, wherein any sulfur dioxide emissions produced in step (a) (iv) are recycled to step (a) (i) for admixture with said sulfur dioxide-containing gas stream.

29. A method as claimed in claim 26, wherein said first absorbing medium saturated with sulfur dioxide is charged into said transportation means and transported to a consuming site where the absorbed sulfur dioxide is removed from the saturated absorbing medium to regenerate the amine absorbent contained therein and thereby produce another sulfur dioxide-depleted absorbing medium and a gaseous stream of substantially pure water-saturated sulfur dioxide for consumption.

30. A method as claimed in claim 29, wherein said other sulfur dioxide-depleted absorbing medium is recycled to step (a) (i) for absorption of sulfur dioxide in said first zone.

* * * * *